US005156778A

United States Patent [19]

Small

[11] Patent Number: 5,156,778

[45] Date of Patent: Oct. 20, 1992

[54] MIXING DEVICE

[75] Inventor: Stuart H. Small, Oslo, Norway

[73] Assignee: Nytek A/S, Oslo, Norway

[21] Appl. No.: 674,360

[22] Filed: May 10, 1991

[30] Foreign Application Priority Data

Nov. 23, 1988 [GB] United Kingdom ................. 8827302

[51] Int. Cl.[5] ............................ B01F 3/04; C02F 3/02

[52] U.S. Cl. .......................................... 261/87; 261/5; 261/DIG. 75; 210/219; 210/220; 210/221.1; 210/620; 366/102; 366/107; 366/164

[58] Field of Search ..................... 210/219, 221.1, 251, 210/220, 620; 261/5, 87, DIG. 75; 209/169; 366/102, 103, 104, 163, 164, 107

[56] References Cited

U.S. PATENT DOCUMENTS

| | | | |
|---|---|---|---|
| 1,471,332 | 10/1923 | Greenawalt | 209/169 |
| 1,779,181 | 10/1930 | McDonald . | |
| 3,092,678 | 6/1963 | Braun | 261/30 |
| 3,175,687 | 3/1965 | Jones | 210/221.2 |
| 3,244,409 | 4/1966 | Delorme | 209/169 |
| 3,400,051 | 9/1968 | Hofschneider | 195/142 |
| 3,865,721 | 2/1975 | Kaelin | 210/628 |
| 4,750,994 | 6/1988 | Schneider | 209/169 |

FOREIGN PATENT DOCUMENTS

| | | | |
|---|---|---|---|
| 000293 | 1/1979 | European Pat. Off. . | |
| 3705716 | 9/1987 | Fed. Rep. of Germany . | |
| 1207073 | 2/1960 | France . | |
| 72132 | 3/1960 | France . | |
| 277667 | 11/1970 | U.S.S.R. | 261/87 |
| 749327 | 5/1956 | United Kingdom . | |
| 1365184 | 8/1974 | United Kingdom . | |

*Primary Examiner*—Stanley S. Silverman
*Assistant Examiner*—Thomas M. Lithgow
*Attorney, Agent, or Firm*—Parmelee, Bollinger & Bramblett

[57] ABSTRACT

A device for use in the mixing of fluids, e.g. the gasification of liquids, comprises an elongate member including an internal passage; and, mounted on the elongate member via radials arms, one or more venturi members each having a convergent-divergent duct whose axis is substantially tangential to the elongate member, and in which the neck of the duct has an opening in communication, via passages in the radial, with the internal passage. On rotation of the device, reduced pressure in the duct neck draws fluid down the shaft of the elongate member.

16 Claims, 3 Drawing Sheets

MIXING DEVICE

Field of the Invention

This invention relates to a mixing device of the type intended to mix two fluids, e.g. with the intention of gasifying a liquid.

BACKGROUND OF THE INVENTION

Aspirators and aerators are well known. The usual form of an aspirator is based on the decrease of static pressure in a liquid flowing through a constriction in some form of venturi member, i.e. a convergent-divergent duct. Pressure is lowest in the neck of the duct.

A conventional venturi duct is defined by inwardly-curved walls. The duct is usually symmetrical about its axis.

GB-A-1365184 discloses an ejector device, comprising two tangentially-mounted ejector nozzles, adapted to rotate in a microorganism culture liquid and to create a flow of the liquid under pressure with entrained air.

U.S. Pat. No. 4,297,214 discloses aeration apparatus comprising a hollow shaft and, near the bottom of the shaft, a gas outlet and a vaned impeller. On rotation, liquid is circulated past the gas outlet and through the impeller. Tangential velocities of 200 to 450 m/min are disclosed GB-A-2043475 discloses a hollow shaft and an impeller having tangential ribs and radial tubes adapted to draw in gas, on rotation, owing to the "liquid break-away zones" created in the wake of the tubes. Data are given, but not on the rate of rotation.

EP-A-0155701 discloses a rotor, mounted on a hollow shaft, having radial grooves. When the shaft is rotated in a liquid, gas flows into the groovesand into the liquid as fine bubbles. A positive supply of gas is required, e.g. at a rate of 30 1 air/min and at a speed of rotation of 1000 rpm.

Other stirrers requiring a positive input of gas are disclosed in GB-A-0832526 and GB-A-2059788. An agitator comprising a prism-shaped rotor, having near radial channels discharging at the axial leading edges of the faces of the prism, is described in GB-A-0745457.

SUMMARY OF THE INVENTION

A device according to the present invention comprises an elongate member including an internal passage; and, mounted on the elongate member, one or more venturi members each having a convergent-divergent duct whose axis is substantially tangential to the elongate member, and in which the neck of the duct has an opening in communication with the internal passage.

When the venturi members are rotated about the elongate member or shaft, the pressure at the outer ends of the radial passages is lower than the pressure in the passage in the shaft. Fluids can thus be mixed. In particular, and as described below, a method of gasifying a fluid such as waste water, comprises rotating the venturi members in the fluid and drawing gas through the shaft and into contact with the fluid. The air or other gas is drawn into the fluid solely by the rotation, without the need for pumps or other moving parts in contact with the fluid(s).

DESCRIPTION OF THE INVENTION

The present invention is based on the immersion of open-ended venturi members, with constrictions between their ends, in water, sewage or other liquid. The constricted neck regions are provided with pressure-tapping tubes with direct connection to the atmosphere, air volume or other gas volume over the liquid. The venturi members are constrained to move through the liquid by attachment to a rotating shaft. The speed of rotation of the shaft is adjusted to cause air or other gas to be sucked in and mixed into the liquid through the pressure-tapping tubes. The venturi members responsible for aerating or gasifying the liquid in this way may form part of more complicated apparatus including knife-edges, impeller blades etc. for macerating and mixing a liquid containing solids. The rotor may be matched to a stator or contra-rotating mechanism in order to counteract any tendency for the liquid to rotate with the rotor and thereby reduce the effectiveness of gasification of the liquid

BRIEF DESCRIPTION OF THE DRAWINGS

The invention summarised above, and certain related aspects which may be used independently or in conjunction, will now be described by way of example only with reference to the accompanying drawings, in which

FIG. 1 is a sketch of a demonstration device comprising an elongate shaft 1 having an axial passage 2 in connection with radial passages 3,4 in radial arms 5,6. Each arm bears a venturi member 7 (e.g. 10×4×4 cm) having an internal constriction (e.g. down to 2 cm into which the respective radial passage opens; this is shown in the partially-sectional view of one of the bodies 7.

On rotation in a liquid, while the top of the shaft 1 is open to the air, the reduction of pressure in the constrictions draws air down the shaft, through the radial tubes and into the liquid.

Figure 2:
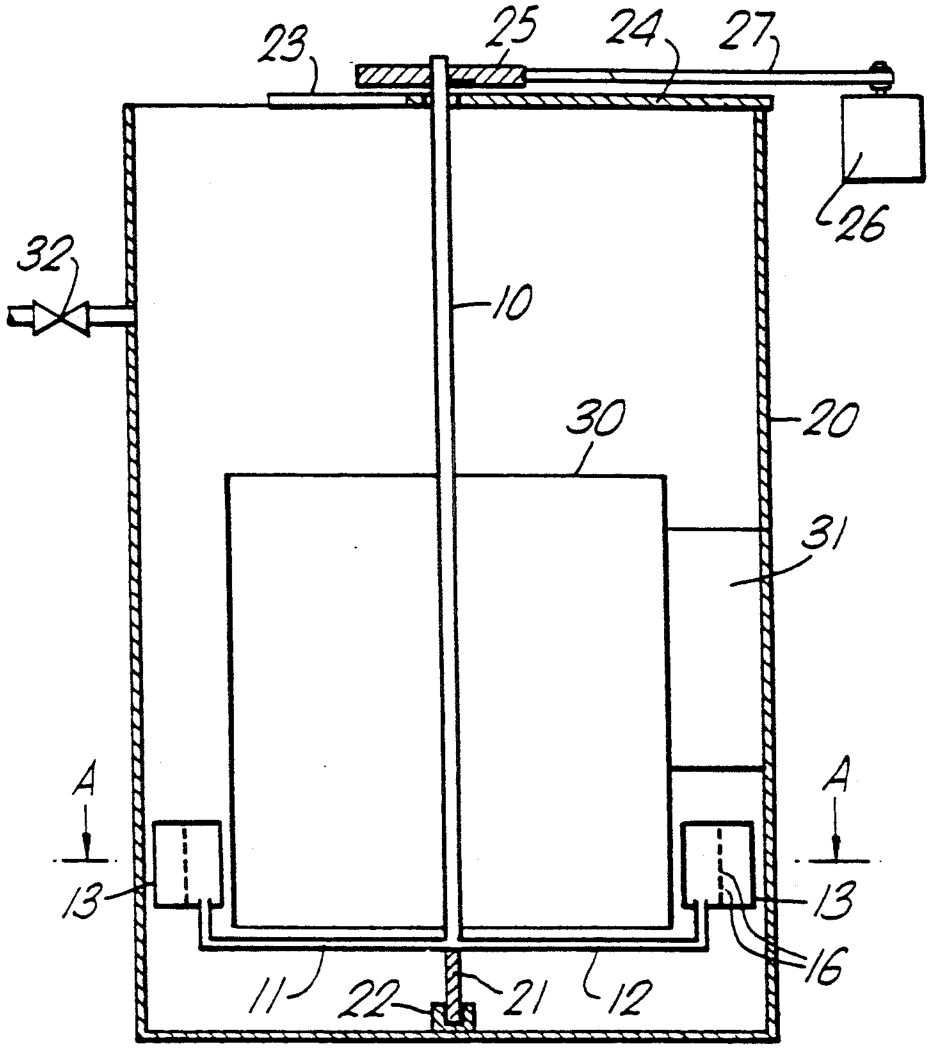
FIG. 2 is a sectional view of gasification apparatus embodying the invention.
Figure 3:
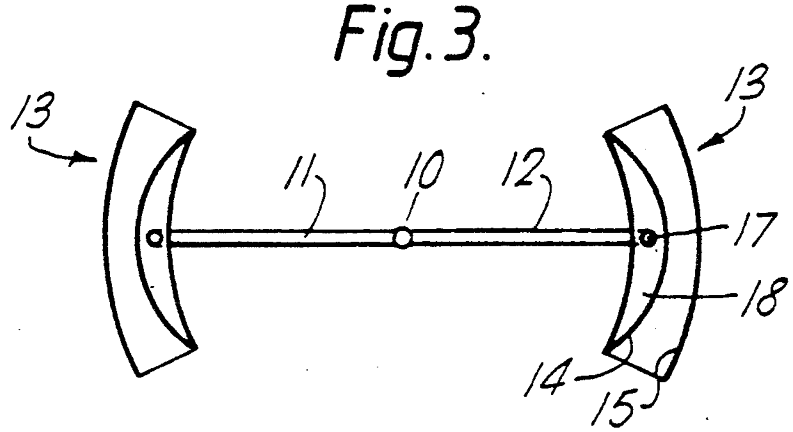
FIG. 3 is a sectional view, along the A—A in FIG. 2, of the gasification device used in the apparatus of that drawing.

FIGS. 2 and 3 show a gasification device comprising an elongate hollow shaft 10 having radial arms 11,12 on each of which a venturi member 13 is mounted. The venturi members 13 are unconventional, in that the convergent-divergent duct is defined by an opposed inwardly-curving wall 14 and an outwardly-curving wall 15. The curvature of the inwardly-curving wall 14 is greater than that of the outwardly-curving wall 15, in order to provide the necessary constriction or neck region. The inwardly-curving wall 14 includes, in the neck region, a plurality of apertures 16, whereby the low-pressure neck of the venturi duct is in connection, via the hollow radial arms 11,12, with the hollow shaft 10 and thus with the atmosphere at the upper, open end of the shaft 10. Each venturi member 13 includes a chamber 18, having an inlet 17 into which the respective radial arm opens, on the other side of the inwardly-curved wall 14 from the duct. The apertures 16 are formed between the chambers 18 and the duct As shown in FIG. 2, the device is mounted in a tank 20. The device includes a support member 21 mounted in a journal 22. The shaft 10 is held at its upper end within a member 23 having three arms resting on the upper edge of the tank 20, one arm 24 being seen in section.

The apparatus includes means for rotating the device. At its upper end, a pulley 25 is mounted on the shaft 10, the pulley being driven by means of a motor 26 via a belt 27.

Figure 1:
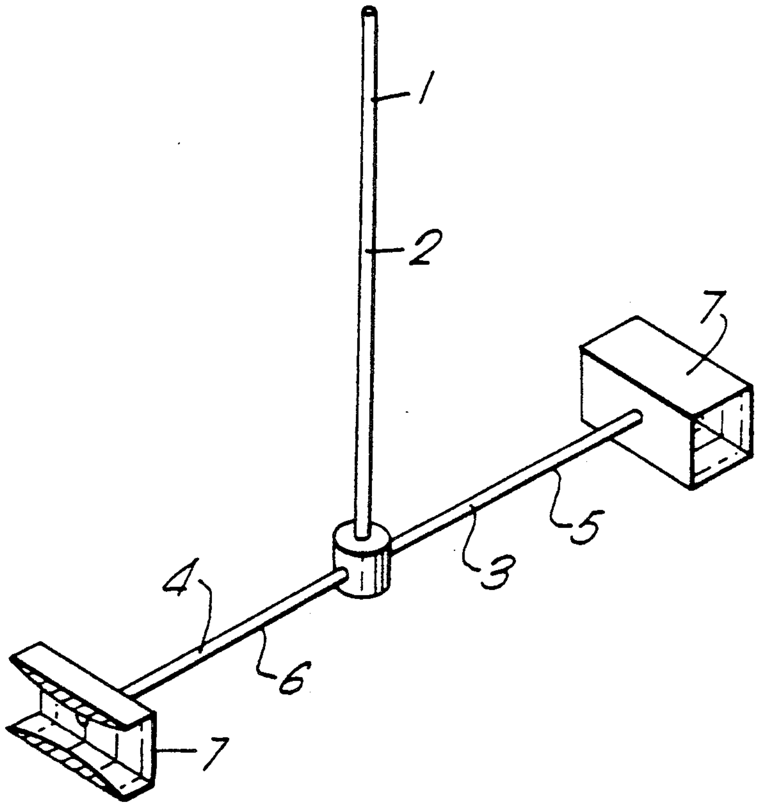
FIG. 1 is a partially cut-away perspective view of a gasification device embodying the present invention.

The apparatus further comprises an open-ended right cylindrical tube 30 which is mounted within the tank 20 by means of a plurality, e.g. three, spaced-apart members 31. The tank 20 and the tube 30 define an annular space within which the venturi members 13 are free to rotate The members 31 have the functional effect of acting as stators, for counteracting the rotational flow of liquid in the tank, when the gasification device is rotated. Liquid can be removed from the tank via a valve 32. In use, the apparatus operates on the same principle as that described above with respect to FIG. 1.

Figure 4:
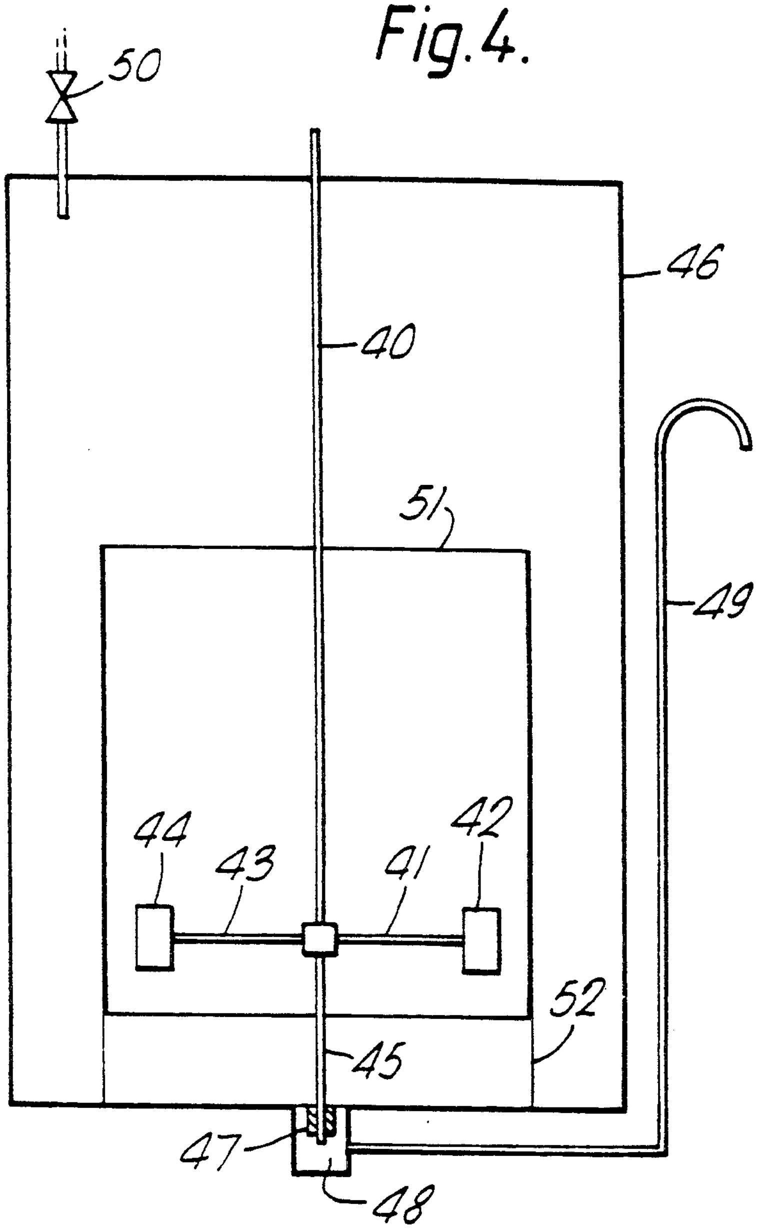
FIG. 4 is a schematic view of an alternative embodiment of the invention.

FIG. 4 shows an elongate hollow shaft 40 connected via a hollow radial arm 41 to a venturi member 42 (which can be of the same type as that illustrated above). Although such venturi members will usually be mounted radially opposite each other, in pairs, it is for the purposes of illustration that FIG.4 shows, on a hollow radial arm 43, a filtration device 44. This filtration device is connected, not to the shaft 40 and thus to the atmosphere, but to a continuation shaft 45 which leads downwardly and out of the tank 46 in which the device is mounted, e.g. by means including a member of the type illustrated as 23 in FIG. 2. The shaft 45 is mounted in a liquid-tight bearing 47, and allows passage of liquid filtered by the device 44 to pass into a chamber 48 and thus to an outlet via a hydraulic leg 49. A valve 50, e.g. a ball-cock valve, which controls the input of liquid into the tank 46, can be used to determine the level of liquid in the tank and thus the height of the hydraulic leg; the line 49 is suitably formed of a flexible material.

FIG. 4 further shows an open-ended tube 51 mounted in the tank 46 on legs 52. Unlike the apparatus shown in FIG. 2, the device shown in FIG. 4 is mounted within the tube. In each case, however, rotation of the device causes circulation of liquid through the tube and thus throughout the tank.

Figure 5:
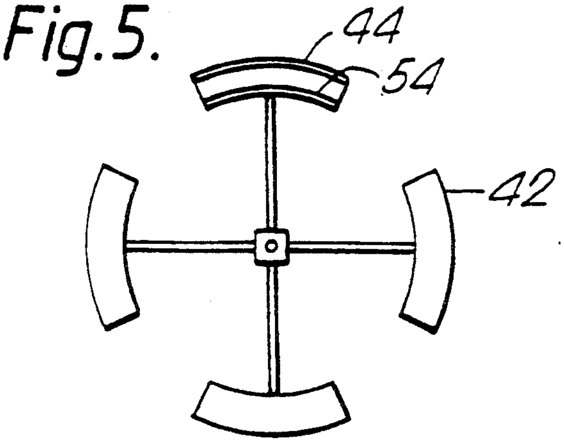
FIG. 5 is a plan view of a gasification/filtration device of the invention.

FIG. 5 shows in plan view a device of the type which might be used in the apparatus shown in FIG. 4. It comprises an opposed pair of venturi members 42 and an opposed pair of filtration members 44, one of which is shown in detail, and has an internal wall 54 of a filtration material, defining a curved duct of circular cross-section. A filtration member of this type may be formed by wrapping a filter material around a former having the shape of the desired duct, securing the filtration material by bonding, and mounting the filter within a duct such that the non-duct side of the filter is in communication with an inlet which is or can be connected to a radial arm of the device. The filtration effect can be comparable to that observed in apparatus of the type described in GB-A-2114460.

Apparatus of the invention including suitable design of rotors and stators should be capable of providing almost any degree of grinding of suspended solids. Farm slurries and domestic wastes in particular should present no problems For good mixing and/or gasification in a depth of liquid, venturi members may be mounted on a common shaft at different depths and/or within a cylinder which thereby limits the volume of liquid undergoing immediate treatment; the cylinder can be placed in a larger volume of liquid, and treatment throughout the volume of liquid is caused as a result of fluid flow through the cylinder.

Aeration efficiency will be significantly enhanced by bubble fractionation due to rotor-induced shear forces The operation of rotors in suitable eductor tube housing will produce intense circulatory mixing even of thicker slurries. Examples of apparatus of this type are shown in FIGS. 2 and 4.

A unit of the type shown in FIG. 2 may be used to treat farm slurry by aerobic thermophilic bacteria, to reduce pollution of the countryside and improve working conditions on farms. The unit is dimensioned to treat slurry from 25 milking cows on a continuous basis. The amount of slurry produced is taken to be $25\times40=1000$ l/d, containing $25\times6=150$ kg biodegradable organic material. The energy latent in the slurry is reckoned to be something like $150\times4000$ kcal/d$=6.10^5$ kcal/d. This corresponds to $6.10^5/860=698$ kWh/d or very nearly 30 kW continuously.

Referring to FIG. 2, the slurry is tipped into the treatment tank 20 in some convenient way, usually by tractor. The treatment zone of the tank has a retention time=7d, corresponding to a volume of 7 $m^3$.

In the treatment tank, large amounts of air are mixed in continuously by a aerator which also grinds any solids present into small particles. Conditions are thus encouraged for the rapid growth of a large population of aerobic thermophilic bacteria which convert the biodegradable material into carbon dioxide, water and sweet-smelling sludge.

The volume of sludge in the treatment tank is brought down to the same level each morning before fresh slurry is added. This is done by opening the valve 32, and directing treated sludge on to a drying bed. Evaporation to the atmosphere may be assisted by heat transferred by a heat exchanger from the treatment tank 20.

When removed from the drying bed, the dewatered sludge can be expected to contain 20–30% solids. The amount of treated solids is expected to be about 50 kg/d. The amount of dewatered treated sludge to be handled is therefore expected to be something like 200–250 kg/d.

Apparatus of the invention may therefore be used for continuous processing of farm slurry, to obtain a sweet-smelling end product which can be easily stored for land application or sold in smaller portions, for use in household gardens etc. There is reason to believe that the amount of heat generated will be sufficient to evaporate all of the water which would otherwise have to be released as water to the environment. If less water is evaporated than expected, a non-clogging filter may be included (see FIG. 4) in the aerator assembly. Water extracted through the filter should meet the requirements for direct discharge to most recipients.

It is anticipated that the invention will usually be practised as illustrated, i.e. using an upright shaft and substantially horizontally-aligned rotors. In practice, the venturi may be tilted somewhat, in order to enhance the impeller action.

It will be appreciated that a rigid shaft may extend upwardly and/or downwardly from the rotor(s). Further, means may be provided where an inlet for gas is taken off from, or from the other side of a rotor from, a rigid shaft. If desired, each of a plurality of venturi members may take gas from a different source; the shaft on which they are mounted will be designed appropriately.

As indicated above, stators may be provided, in order to counteract the tendency of the liquid to swirl. If desired, the same general effect may be achieved by providing counter-rotating gasification/filtration devices.

The illustrated venturi members have an open end:neck ratio of the order of 2:1. Higher ratios may be preferred. The "throttling" effect of the venturis can be matched to the speed of rotation of the device, and will also depend on the length of the radial arms.

The particular venturi members of the type illustrated in FIGS. 2 and 3 are adapted to rotate within a tank or tube whose internal wall is circular in cross-section. The desired effect may be achieved if the rotating venturi member is open to that wall, so that the tube or tank itself partially defines the venturi duct.

A further alternative venturi member which may be used, according to the invention, comprises two radially-extending members defining a convergent-divergent duct whose neck region extends radially, and one or more apertures formed in one of the members along the neck region. The size of respective apertures may vary according to their distance from the centre of rotation. More generally, the venturi members may be constructed in order to minimise turbulent flow. This may involve designing the leading and trailing openings of the duct so as to compensate for the pressure loss caused by gas inflow in the neck region.

I claim:

1. A device adapted for use in the mixing of fluids, comprising an open-ended tube having an internal wall and in which an elongate member including an internal passage is axially and rotatably mounted; and one or more venturi members each mounted on an arm having on internal passage, said arm and the internal passage of said arm extending radially from the elongate member to each venturi member and providing a circle of rotation of each venturi member about the elongate member, each venturi member defining in itself or with the internal wall of the tube, a convergent-divergent duct having a neck between the convergent and divergent portions of the duct, each duct having an axis substantially tangential to the circle of rotation of the venturi member, and in which the neck of each duct has an opening extending form the duct through the neck and in communication, via the respective internal passage of said arm on which each venturi member is mounted, with the internal passage of said elongated member.

2. A device according to claim 1, which comprises one or more pairs of the venturi members, the venturi members in each pair being mounted radially opposite each other.

3. A device according to claim 1 wherein each venturi member is a venturi comprising a convergent-divergent duct defined by opposite walls respectively curved inwardly and outwardly, and one or more openings, in the neck region of the duct, in the inwardly-curved wall.

4. A device according to claim 3 in which each venturi further comprises a chamber, having an inlet in communication with the respective arm on which each venturi member is mounted, on the other side of the inwardly-curved wall from the duct.

5. A device according to claim 2 wherein each venturi member is a venturi member comprising a convergent-divergent duct defined by opposite walls respectively curved inwardly and outwardly, and one or more openings, in the neck region of the duct, in the inwardly-curved wall.

6. A device according to claim 5, in which each venturi further comprises a chamber, having an inlet in communication with the respective arm on which each venturi member is mounted, on the other side of the inwardly-curved wall from the duct.

7. A device according to claim 1 in which each venturi is open to the internal wall of the tube.

8. Apparatus for use in the gasification of fluids, which comprises a tank having mounted therein a device comprising an open-ended tube having an internal wall and in which an elongate member including an internal passage is axially and rotatably mounted; and one or more venuturi members each mounted on an arm having an internal passage, said arm and said internal passage of said arm extending radially from the elongate member to each venturi member and providing a circle of rotation of each venturi member about the elongate member, each venturi member defining in itself or with the internal wall of the tube, a convergent-divergent duct having a neck between the convergent and divergent portions of the duct, each duct having an axis substantially tangential to the circle of rotation of the venturi member, and in which the neck of each duct has an opening extending from the duct through the neck and in fluid communication, via the respective internal passage of said arm on which each venturi member is mounted, with the internal passage of said elongate member.

9. Apparatus according to claim 8, which additionally comprises one or more stators located in said tank for counteracting the rotational flow of a liquid in which the device is rotated.

10. Apparatus according to claim 8, which additionally comprises means for rotating the device.

11. A method of gasifying a liquid with a gas which comprises placing in said liquid a device comprising an open-ended tube having an internal wall and in which an elongate member including an internal passage is axially and rotatably mounted; and one or more venturi members each mounted on an arm having an internal passage, said arm and said internal passage extending radially from the elongate member to said venturi member and providing a circle of rotation of each venturi member about the elongate member, each venturi member defining in itself or with the internal wall of the tube, a convergent-divergent duct having a neck between the convergent and divergent portions of the duct, each duct having an axis substantially tangential to the circle of rotation of the venturi member, and in which the neck of each duct has an opening extending from the duct through the neck and in fluid communication, via the respective internal passage of said arm on which each venturi member is mounted, with the internal passage of said elongate member, and rotating said elongate member in said liquid thereby causing end venturi member to rotate and cause gas to flow down said internal passage of said elongate member, through the internal passage of the arm end through the opening in said neck and into the duct to mix with said liquid.

12. A method according to claim 11, in which the gas is air and the liquid is sewage.

13. Apparatus for use in the gasification of fluids according to claim 8, wherein the device comprises one or more pairs of venturi members, the venturi members in each pair being mounted radially opposite each other.

14. Apparatus for use in the gasification of fluids according to claim 8, wherein each venturi member is a venturi member comprising a convergent-divergent duct defined by opposite walls respectively curved inwardly and outwardly, and one or more openings in the neck region of the duct, in the inwardly-curved wall.

15. Apparatus for use in the gasification of fluids according to claim 14 in which each venturi of the device further comprises a chamber, having an inlet in communication with the respective arm on which each venturi member is mounted, on the other side of the inwardly-curved wall from the duct.

16. A device according claim 1 wherein the or each venturi is tilted with respect to the horizontal.

* * * * *